United States Patent [19]

Bos

[11] Patent Number: 4,566,758
[45] Date of Patent: Jan. 28, 1986

[54] RAPID STARTING, HIGH-SPEED LIQUID CRYSTAL VARIABLE OPTICAL RETARDER

[75] Inventor: Philip J. Bos, Portland, Oreg.

[73] Assignee: Tektronix, Inc., Beaverton, Oreg.

[21] Appl. No.: 493,107

[22] Filed: May 9, 1983

[51] Int. Cl.[4] .......................... G02F 1/13; G02F 1/137
[52] U.S. Cl. ................... 350/346; 350/347 E; 350/350 R
[58] Field of Search ............... 350/340, 341, 334, 346, 350/347 R, 347 E, 350 R

[56] References Cited

U.S. PATENT DOCUMENTS

| | | | |
|---|---|---|---|
| 3,784,280 | 1/1974 | Bigelow | 350/335 |
| 4,084,884 | 4/1978 | Raynes | 350/341 X |
| 4,097,128 | 6/1978 | Masumoto et al. | 350/347 E |
| 4,165,923 | 8/1979 | Janning | 350/341 |
| 4,239,345 | 12/1980 | Berreman et al. | 350/334 |
| 4,333,708 | 6/1982 | Boyd et al. | 350/346 |

OTHER PUBLICATIONS

Berreman et al, "New Bistable Cholesteric Liquid Crystal Display", Appl. Phys. Lett. 37(1), American Institute of Physics, Jul. 1, 1980, pp. 190–111.
Berreman et al, "Disclination-Free Bistable Twist Cells", 1980 Biennial Research Conference, Oct. 1980.
Hubbard et al., "Optical-Bounce Removal and Turnoff-Time Reduction in Twisted Nematic Displays", IEEE Trans. Elec. Dev., vol. ED-28, No. 6, Jun. 1981.
Van Doorn, "Transient Behavior of Twisted-Nematic Liquid-Crystal Layer in Electric Field", Journal de Physique., vol. 36, pp. C1-261,-263, 1975.

Primary Examiner—John K. Corbin
Assistant Examiner—David Lewis
Attorney, Agent, or Firm—John D. Winkelman; Paul S. Angello

[57] ABSTRACT

A liquid crystal cell (100) includes a chiral additive in the liquid crystal material (106) to operate the cell as a rapid starting, high-speed variable optical retarder. The cell is fabricated so that the surface noncontacting directors (116 and 118) of the opposed surfaces of the director alignment layers (112 and 112') of the electrode structures (102 and 104) are tilt-biased in opposite directions. This surface contacting director configuration induces rapid surface noncontacting director (120a, 120b, 120c, 120d, 120e) relaxation without optical bounce when the cell is switched from the field aligned ("ON") state to the partly relaxed ("OFF") state. The chiral additive prevents an inactive cell from relaxing to the splayed topological state, thereby enabling switching operation without a warm-up delay and preventing the surface of the cell from having a mottled appearance when it remains unused.

5 Claims, 2 Drawing Figures

U.S. Patent  Jan. 28, 1986  4,566,758
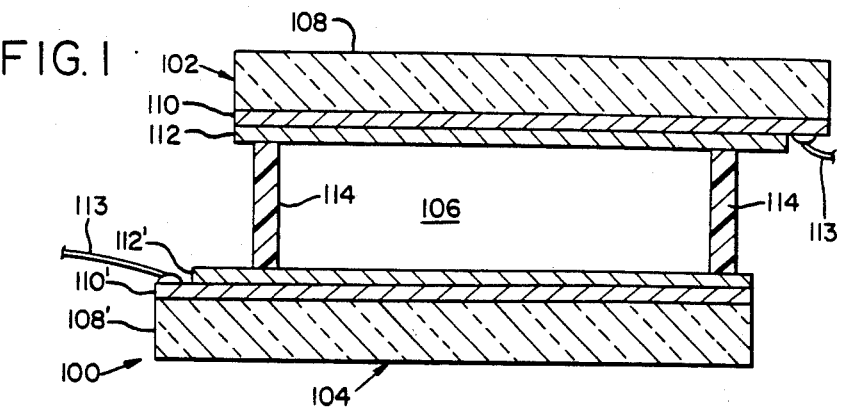
FIG. 1
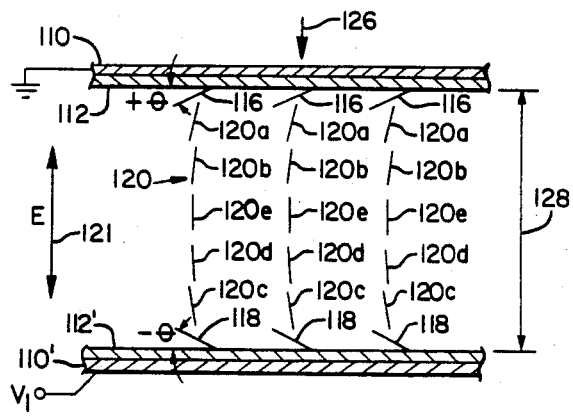
FIG. 2A (ON)
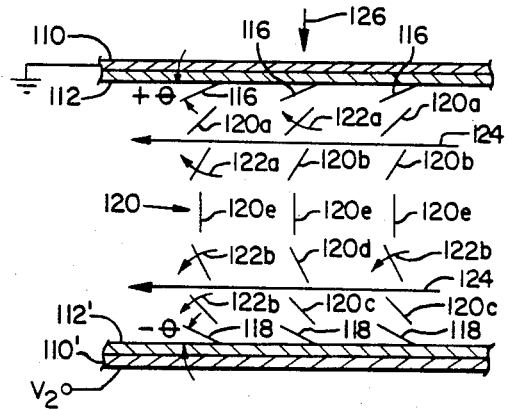
FIG. 2B (OFF)
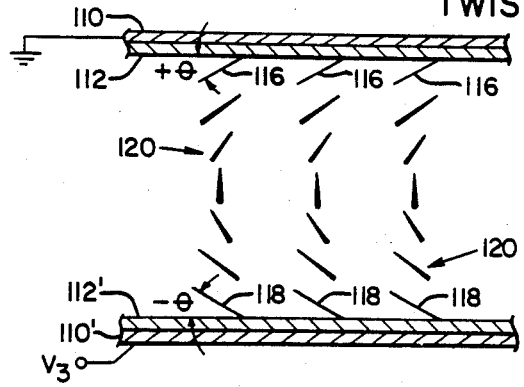
FIG. 2C (OFF + T₁ : π RADIAN TWIST)
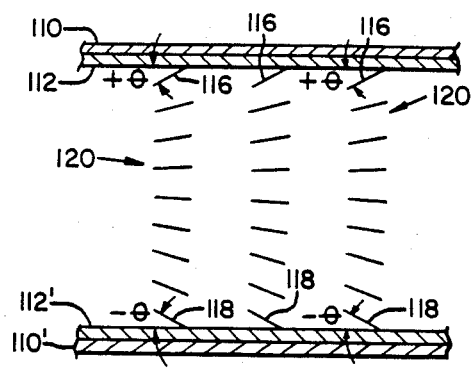
FIG. 2D (OFF + T₂ : SPLAYED)

RAPID STARTING, HIGH-SPEED LIQUID CRYSTAL VARIABLE OPTICAL RETARDER

TECHNICAL FIELD

The present invention relates to liquid crystal devices, and in particular, to a liquid crystal cell which includes a chiral additive to the liquid crystal material to operate the cell as a rapid starting, high-speed variable optical retarder.

BACKGROUND OF THE INVENTION

Liquid crystal cells are known which include a pair of opposed electrode structures having inner conditioned surfaces in face-to-face opposition and liquid crystal material therebetween with surface contacting alignment directors characterized in that the tilt bias angles of the directors in contact with one conditioned surface are defined in a rotational sense which is opposite to the tilt bias angles of the directors in contact with the other conditioned surface. Such a cell is described, for example, in Column 7, lines 48-55 of U.S. Pat. No. 4,333,708 of Boyd, et al.

A liquid crystal cell of this construction has been included as a portion of the alternating-tilt geometry cell of the Boyd, et al patent which describes an optical switch that undergoes disclination movements within the cell in an attempt to provide a bistable switch.

SUMMARY OF THE INVENTION

A liquid crystal cell of the above-described construction has first and second distinct topological states. The first state is the operational topological state of the cell and includes both the "ON" and "OFF" switching states thereof. The second state is the nonoperational topological state of the cell and includes the splayed molecular configuration or state of the cell.

The "ON" switching state of the cell provides substantially reduced optical retardation of light passing therethrough, and the "OFF" switching state of the cell provides essentially half-wave retardation of light of a predetermined wavelength. Both the "ON" and "OFF" states are topologically equivalent to the $\pi$ radian twist state, and it is desirable that the liquid crystal cell remain in topologically equivalent states to eliminate any warm-up delay, which can be as long as several minutes, prior to operation of an inactive cell. Thus, the cell of the present invention, which remains relaxed in the $\pi$ radian twist state, will respond substantially instantaneously to an electric field introduced within the cell to switch the cell to the "ON" state.

Accordingly, one of the objects of this invention is to provide a variable optical retarder which employs a liquid crystal cell of rapid response that requires no warm-up delay when it is initially operated.

Another object of this invention is to provide such a variable retarder which incorporates a chiral additive to the liquid crystal material to promote equilibrium within the cell in the $\pi$ radian twist state.

A further object of this invention is to provide such a variable retarder which does not require the introduction of an electric field within the liquid crystal cell to prevent the cell from relaxing into the splayed state and thereby to enable rapid switching response from the "OFF" to the "ON" states.

Still another object of this invention is to provide such a variable retarder in which an image presented on the surface of an inactive cell is prevented from having a mottled appearance when it remains unused.

The present invention relates to a rapid starting, high-speed liquid crystal variable optical retarder which comprises a liquid crystal cell containing liquid crystal material between a pair of opposed, spaced-apart optically transparent electrode structures. The liquid crystal material has directors and includes a chiral additive to inhibit director relaxation beyond the $\pi$ radian twist state. Each electrode structure has a conductive layer applied thereto. The inner surface of each electrode structure has been conditioned so that the directors of the liquid crystal material in contact therewith become substantially uniformly aligned to form tilt bias angles with the conditioned surface. The tilt bias angles of the directors in contact with the conditioned surface of one electrode structure are defined in a rotational sense opposite the tilt bias angles of the directors in contact with the conditioned surface of the other electrode structure. The variable retarder also comprises field means for applying an electric field to a liquid crystal cell whose directors are initially relaxed in the $\pi$ radian twist state. Such field when it switches the cell to an "ON" state causes a substantial number of the surface noncontacting directors substantially instantaneously to align in substantially end-to-end relation in a direction normal to the conditioned surfaces to provide substantially reduced optical retardation through the cell of light incident to one of the surfaces of the electrode structures. The field means also changes the electric field to switch the cell into an "OFF" state by causing at least some of the surface noncontacting directors within the interior of the cell rapidly to recede from the end-to-end alignment to provide essentially half-wave optical retardation of light incident to one of the surfaces of the electrode structures.

The chiral additive to the liquid crystal material prevents the directors from relaxing to the splayed state after an "ON" to "OFF" switching operation of the cell is complete. As a result, reactivation of the cell may be accomplished without a warm-up delay, and the image presented on the surface of an inactive cell is prevented from having a mottled appearance.

Additional objects and advantages of the present invention will be apparent from the following detailed description of a preferred embodiment thereof which proceeds with reference to the accompanying drawings.

BRIEF DESCRIPTION OF THE DRAWINGS

FIG. 1 is a diagrammatic cross-sectional side elevation view of the liquid crystal cell of the present invention.

FIGS. 2A, 2B, 2C, and 2D are diagrams of the director alignment configuration of the liquid crystal cell of the present invention in, respectively, the field aligned ("ON") state, the partly relaxed ("OFF") state, the $\pi$ radian twist state, and the splayed state.

DETAILED DESCRIPTION OF PREFERRED EMBODIMENT

A preferred embodiment of the present invention incorporates a liquid crystal cell operating as a zero to half-wave optical retarder which controls the retardation of light therethrough in response to the intensity of an electric field produced by an excitation voltage applied to the cell electrode structures.

The term optical retardation insofar as it herein pertains and is referred to birefringence is defined by way of the following explanation. A light ray incident on a birefringent device is known to be decomposed into two components known as the ordinary and extraordinary light rays. These components of light travel through the birefringent device at different velocities, and when exiting the device, one of the rays is retarded with respect to the other. Retardation results in a relative phase shift between the two exiting rays, which retardation is also related to the wavelength of the exiting ray of light. For example, a device which has an effective birefringence such that $$\frac{\Delta nd}{\lambda} = \frac{1}{2}$$

is referred to as a half-wave retarder, where $\Delta n$ is the effective birefringence, d is the device thickness, and $\lambda$ is the wavelength of the exiting light ray.

With reference to FIG. 1, liquid crystal cell 100 includes a pair of generally parallel, spaced-apart electrode structures 102 and 104 with nematic liquid crystal material 106 included therebetween. Electrode structure 102 comprises glass dielectric substrate 108 which has on its inner surface a layer 110 of electrically conducting, but optically transparent material such as indium tin oxide. Director alignment film layer 112 is applied to conductive layer 110 and forms a boundary between electrode structure 102 and liquid crystal material 106. The surface of film 112 which contacts the liquid crystal material is conditioned in accordance with one of two preferred methods to promote a preferred orientation of the directors of the liquid crystal material in contact therewith. The materials constituting and the corresponding methods of conditioning the director alignment film 112 are described in detail hereinbelow. Electrode structure 104 is of a construction similar to that of electrode structure 102, and the components corresponding to those of electrode structure 102 are shown with identical reference numerals followed by primes.

The short length edges of electrode structures 102 and 104 are offset relative to each other to provide access to conductive layers 110 and 110' for connection at terminals 113 the output conductors of retarder driver circuit (not shown). Spacers 114 may be comprised of any suitable material such as glass fiber to preserve the general parallel relation between electrode structures 102 and 104.

With reference to FIGS. 2A–2D, the nematic director alignment configuration of layers 112 and 112' in liquid crystal cell 100 is described in Column 7, lines 48–55 of U.S. Pat. No. 4,333,708 of Boyd, et al. It will be understood, however, that the liquid crystal cell described in the Boyd, et al patent differs from that of the present invention in that the former includes an alternating-tilt geometry type configuration of which the director alignment of cell 100 comprises only a portion. The cell of the Boyd, et al patent is constructed to promote disclination movement within the cell in an attempt to provide a bistable switching device.

The film layer 112 of electrode structure 102 is conditioned so that the electrode structure surface contacting directors 116 are aligned parallel to each other at a tilt bias angle $+\theta$ which is measured in the counterclockwise sense with reference to the surface of film layer 112. The film layer 112' of electrode structure 104 is conditioned so that the electrode structure surface contacting directors 118 are aligned parallel to each other at a tilt bias angle $-\theta$ which is measured in the clockwise sense with reference to the surface of film layer 112'. Thus, liquid crystal cell 100 is fabricated so that the surface contacting directors 116 and 118 of the opposed surfaces of director alignment layers 112 and 112' of electrode structures 102 and 104, respectively, are tilt-biased in opposite directions. As shown in FIGS. 2A–2D the surface contacting directors 116 and 118 are oriented in the plane of the drawings such that their projections onto the respective director alignment layer 112 and 112' are parallel to each other.

A first preferred method of effecting the desired alignment of the surface contacting directors entails the use of polyimide as the material which comprises the alignment film layers 112 and 112' on electrode structures 102 and 104, respectively. Each alignment film layer is rubbed to produce a tilt bias angle $|\theta|$, with 2° to 5° being the preferred range. A second preferred method of effecting the desired alignment of the surface contacting directors entails the use of silicon monoxide as the material which comprises the alignment film layers 112 and 112' of electrode structures 102 and 104, respectively. The silicon monoxide layer is evaporated and vapor deposited preferably at a 5° angle measured from the electrode structure surface in an amount sufficient to produce a tilt bias angle $|\theta|$ of between 10° to 30°, with 15° to 25° being the preferred range.

It will be appreciated that methods for depositing silicon monoxide or other alignment materials to align liquid crystal molecules in a predetermined direction have been disclosed previously by others and are known to those having ordinary skill in the art. One such method, for example, is disclosed in U.S. Pat. No. 4,165,923 of Janning.

FIG. 2A depicts the orientation of surface noncontacting directors 120, which do not contact the conditioned surfaces of alignment layers 112 and 112' when an AC signal $V_1$ of approximately 2 kHz and 20 Vrms is applied to conductive layers 110 and 110' of electrode structures 102 and 104, respectively. The signal $V_1$ on conductive layer 110' constitutes a first switching state produced at the output of the retarder driver circuit and produces an alternating electric field, E, between electrode structures 102 and 104 within the liquid crystal cell 100 to force the cell into its "ON" srate. A substantial number of the surface noncontacting directors 120 of a liquid crystal material 106 which has a positive anisotropy value align essentially end-to-end along direction 121 of the electric field flux lines within the cell, which direction is normal to the conditioned surfaces of the electrode structures. Thus, when cell 100 is excited into its "ON" state, the surface noncontacting directors 120 are aligned perpendicularly to the surfaces of the cell. It should be noted that the surface contacting directors 116 and 118 substantially maintain their tilt bias angles $|\theta|$ in the first and second topological states of the cell which are shown in FIGS. 2A to 2C and FIG. 2D, respectively.

FIG. 2B depicts the orientation of surface noncontacting directors 120 after the signal $V_1$ is removed so that the alignment of surface noncontacting directors is influenced not by an electric field produced between electrode structures 102 and 104 within the cell, but by the intermolecular elastic forces which cause relaxation of the surface noncontacting directors from the end-to-end alignment of the "ON" state. The removal of signal V₁ constitute a second switching state produced at the output of the driver circuit. The director orientation shown in FIG. 2B corresponds to that of the "OFF" state of the cell.

Switching cell 100 to the "OFF" state can also be accomplished by applying to the cell a pulsed AC signal V₂ produced at the output of driver circuit having a voltage level which is less than that of signal V₁ and generally near 0V. The frequency of signal V₂ is generally the same as that of signal V₁.

During the transition from the "ON" state to the "OFF" state of the liquid crystal cell, the surface noncontacting directors recede from the end-to-end alignment normal to the electrode structure surfaces rotating about axes that are perpendicular to such normal and attempt to assume a generally parallel relation with the adjacent directors. Thus, surface noncontacting directors 120a and 120b rotate in a clockwise sense as shown by direction arrows 122a in order to achieve a near-parallel relation as respects directors 116 and 120a, respectively; and surface noncontacting directors 120c and 120d rotate in a counterclockwise sense as shown by direction arrows 122b to achieve a near-parallel relation as respects directors 118 and 120c, respectively. Thus, when cell 100 relaxes to its "OFF" state, each one of a substantial number of the surface noncontacting directors is aligned so that it projects a director component onto the surface of the cell. The directors 120 in the "ON" state and the "OFF" state are, therefore, aligned generally in planes that are normal to the surfaces of director alignment layers 112 and 112'.

It should be noted that the surface geometry of cell 100 differs from that of a conventional liquid crystal variable retardation cell such as the one described in the publication Transient Behavior of Twisted Nematic Liquid-Crystal Layer in an Electric Field, "*Journal De Physique*, Vol. 36, pp. C1-C261-C1-263, 1975 by Van Doorn in which the tilt bias angles are of the same rotational sense as measured from the inner surfaces of the electrode structure. The surface contacting director configuration of cell 100 induces rapid surface noncontacting director relaxation without any optical bounce from the "ON" state to the "OFF" state. It is presently believed that the rapid, optical bounce-free director relaxation is caused by the flow of liquid crystal material in the same direction 124 along both conditioned surfaces of the cell that is unidirectionally. Such unidirectional flow does not occur in the conventional cell described in the publication by Van Doorn which cell experiences liquid crystal material flow in opposite directions along the conditioned surfaces. The beneficial effect of the unidirectional material flow in cell 100 is that no "reverse" torque is applied to the centrally located surface noncontacting directors 102e by such flow in the relaxing cell. The result is that bounce-free, rapid electro-optical switching is achieved.

FIG. 2C depicts the orientation of the directors after a time T₁ during which liquid crystal cell 100 is allowed to relax further beyond the "OFF" state shown in FIG. 2B. This will occur generally if an electric field is not reintroduced within the cell after approximately 50 milliseconds has elapsed from the time the electric field had been removed. The director configuration of the cell shown in FIG. 2C is characterized in that the surface noncontacting directors 120 relinquish their roughly planar configuration and assume what is referred to as a π radian twist or helical configuration. It should be noted that the application of an AC signal V₃ of approximately 1V to the cell will prevent further relaxation of the surface noncontacting directors to the π radian twist state.

The method of operating the liquid crystal cell 100 as a zero to half-wave optical retarder is directed to the disclination-free surface noncontacting director relaxation from the electric field aligned or "ON" state depicted by FIG. 2A to the roughly planar configuration or "OFF" state depicted by FIG. 2B.

Further relaxation of cell 100 from the π twist to the splayed states is prevented in the absence of a periodically applied electric field within the cell by adding a chiral additive material to the host liquid crystal material 106 in accordance with the present invention.

A chiral material is defined as one which when added to a liquid crystal material in the splayed state promotes a twisted or helical configuration of the liquid crystal molecules. Thus, the addition of the chiral material has the effect of making the π twist state the relaxed state of the liquid crystal molecules.

The amount of chiral material which is required to provide a liquid crystal material having the desired molecular helical configuration prior to its inclusion in a liquid crystal cell is determined from the following expression:

$$\frac{4d}{3} \leq p \leq 4d$$

where p represents the pitch of the resulting helix and d represents the thickness 128 of the liquid crystal material and chiral additive mixture contained with the cell. Pitch is defined herein as the distance measured along the helical axis which distance is required for the directors to rotate 360° about the helical axis. It is preferred that chiral material be added to the liquid crystal material in an amount such that the expression $p = 3d$ is satisfied.

The amount of molecular twist produced in the liquid crystal material for the quantities of chiral material within this range has been found to be sufficient to ensure that the liquid crystal and chiral additive mixtures, when included between surface conditioned electrodes 102 and 104, will produce a cell 100 for which the π radian twist state constitutes its lowest energy level.

Any particular type of chiral additive will accomplish the desired effect in a liquid crystal cell of raising the lowest energy level thereof to the energy level of the π radian twist state. A specific example of such a mixture of liquid crystal material and chiral additive is set forth below.

A 6 micron thick liquid crystal cell with the π radian twist state as its final state of relaxation includes a liquid crystal material having a pitch of between 8-24 microns, with 18 microns being the preferred pitch. An exemplary cell 100 fabricated in accordance with the present invention includes liquid crystal compound number 1132 of EM Laboratories, Inc., of Elmsford, N.Y. and chiral compound No. CB 15 of BDH Chemicals, Ltd. of Poole, England in the following amounts:

| Material Type | Amount (weight %) |
|---|---|
| Chiral compound No. CB 15 | 0.8% |
| Liquid crystal compound No. 1132 | 99.2% |

It should be noted that any available chiral material is suitable for the application disclosed herein. In addition, the introduction of a chiral material into the liquid crystal cell causes the cell to deviate from a planar configuration when in the "OFF" state to one which is slightly twisted. There has been no noticeable adverse effect by such surface noncontacting director reorientation.

In the present invention, liquid crystal cell 100 is operated as a zero to half-wave optical retarder whose optic axis corresponds to the alignment direction of the surface noncontacting directors 120.

Linearly polarized light which propagates in direction 126 normal to the surfaces of electrode structures 102 and 104 is coincident with the direction of surface noncontacting directors 120 when the liquid crystal cell is in the "ON" state. Directors 120 are oriented in such "ON" state so that there is a negligible projection of the optic axis on the electrode structure surfaces of the cell. Under these conditions, liquid crystal cell 100 produces substantially reduced optical retardation relative to that developed in the "OFF" state for incident light propagating in the direction 126.

Linearly polarized light which propagates in direction 126 normal to the surfaces of electrode structures 102 and 104 is noncoincident with the alignment direction of surface noncontacting directors 120 when the liquid crystal cell is in the "OFF" state. Directors 120 are oriented in such "OFF" state so that each one of a substantial number of them projects a component on the electrode structure surfaces of the cell. Under these conditions, liquid crystal cell 100 has an effective birefringence for generally normally incident light. The orientation of surface noncontacting directors 20 provides essentially half-wave optical retardation for light of the wavelength which satisfies the mathematical expression:

$$\frac{\Delta nd}{\lambda} = \frac{1}{2}$$

where d represents the thickness 128 and $\Delta n$ represents the effective birefringence of the cell.

This device exhibits relatively fast optical response which is attributable to the elimination of optical bounce that has been accomplished by virtue of the promotion of unidirectional flow of liquid crystal material within the cell during surface noncontacting director realignment which occurs between the transition from the "ON" state to the "OFF" state.

Alternatives and Equivalents

It will be understood that liquid crystal cell 100 can include a liquid crystal material mixture which is characterized by a dielectric anisotropy that changes sign as a function of the frequency of an AC signal which is applied to the cell. Thus, when a low frequency signal such as 200-500 Hz is applied to electrode structures 102 and 104 of the liquid crystal cell, the surface noncontacting directors 120 would tend to align parallel to the electric field direction and normal to the cell surfaces, thereby to assume the "ON" state. On the other hand, when a high frequency signal pulse such as 80-100 kHz is applied to the cell, the surface noncontacting directors 120 would tend to align perpendicularly to the electric field direction and parallel to the cell surfaces. The application of a high frequency signal pulse of sufficient duration would cause the cell to obtain an overall director configuration which would produce half-wave retardation. It is preferred, however, that the liquid crystal cell be used as a single-frequency half-wave retarder to eliminate the need of a complex, high-power drive signal source.

Liquid crystal cell 100 may also be used as a variable optical retarder which provides continuously varying amounts of retardation through the cell of light incident to a surface thereof. In the case of a single-frequency liquid crystal cell, such would be accomplished by adjusting the voltage of the AC signal pulse which is applied to cell 100 to a level which orients the surface noncontacting directors in a configuration that provides the desired first amount of optical retardation. An increase in the voltage applied to the cell produces a corresponding decrease in the amount of director component projection on the surface of the cell, and thereby a second, decreased amount of optical retardation of light incident to the cell.

In the case of a two-frequency liquid crystal cell, continuously varying amounts of retardation would be produced by applying to a cell 100 initially in the "OFF" state a low frequency signal of a first voltage which is sufficient to orient the surface noncontacting directors in a configuration that provides the desired first amount of optical retardation. Continual application of such low frequency signal will prevent the cell from further relaxation and thereby maintain substantially constant optical retardation in the desired first amount. To change the first amount of retardation to a second higher amount of retardation, a high frequency signal pulse of sufficient duration is applied to reorient the surface noncontacting directors to a configuration corresponding to the second retardation state. Continual application of a low frequency signal of a second voltage which is less than the first voltage will prevent the cell from further relaxation and thereby maintain substantially constant optical retardation in the desired second amount.

It will be obvious to those having skill in the art that many changes may be made in the above-described details of the preferred embodiment of the present invention. The scope of the present invention, therefore, should be determined only by the following claims.

I claim:

1. A rapid starting, high-speed liquid crystal variable optical retarder comprising:

a liquid crystal cell which includes a pair of generally parallel electrode structures that contain a mixture of a chiral agent and a nematic liquid crystal material which has directors, the inner surface of each electrode structure including a director alignment layer which has been conditioned so that the directors of the liquid crystal material in contact therewith become substantially uniformly aligned to form tilt bias angles with the conditioned surface, the tilt bias angles of the directors in contact with the conditioned surface of one electrode structure being defined in a rotational sense opposite to the tilt bias angles of the directors in contact with the other conditioned surface of the other electrode structure and the projections of the directors in contact with the conditioned surfaces being aligned so that the projections onto one of the conditioned surfaces are parallel to the projections onto the other conditioned surface; and the liquid crystal cell being operable in response to an applied electric field to cause a substantial number of the surface noncontacting directors to align in substantially end-to-end relation in a direction generally normal to the conditioned surfaces to provide a first amount of optical retardation through the cell of light incident to one of the surfaces of the electrode structures, in rapid response to a substantial diminution of the magnitude of the electric field to cause at least some of the surface noncontacting directors within the interior of the cell to rotate about axes that are perpendicular to the normal to the conditioned surfaces to provide a second amount of optical retardation of light incident to one of the surfaces of the electrode structures, and in response to a relatively prolonged absence of the electric field to inhibit director relaxation to a splayed state.

2. The variable optical retarder of claim 1 in which the second amount of retardation is substantially half-wave optical retardation.

3. The variable optical retarder of claim 1 in which the electrode structure are separated by a distance, d, and the chiral additive is mixed with the liquid crystal material in an amount which causes the directors of the liquid crystal material prior to its inclusion between the electrode structures to have a pitch, p, that satisfies the expression $$\frac{4d}{3} \leq p \leq 4d.$$

4. The variable optical retarder of claim 1 in which the first amount of retardation is essentially zero optical retardation.

5. The variable optical retarder of claim 1 in which the second amount of retardation is determined by the quantity $\Delta nd$, where $\Delta n$ represents the effective birefringence and d represents the thickness, of the cell.

* * * * *